United States Patent [19]

Branning

[11] Patent Number: 4,549,967

[45] Date of Patent: Oct. 29, 1985

[54] FLOCCULANT COMPOSITION

[75] Inventor: Merle L. Branning, Warrenville, Ill.

[73] Assignee: Nalco Chemical Company, Oak Brook, Ill.

[21] Appl. No.: 589,848

[22] Filed: Mar. 15, 1984

Related U.S. Application Data

[63] Continuation of Ser. No. 397,061, Jul. 12, 1982, abandoned.

[51] Int. Cl.[4] .............................................. C02F 1/56
[52] U.S. Cl. .................................... 210/728; 210/734
[58] Field of Search ............... 210/702, 725, 727, 728, 210/733, 734; 252/60, 61

[56] References Cited

FOREIGN PATENT DOCUMENTS

| 51-36763 | 3/1976 | Japan | 210/727 |
| 51-86253 | 7/1976 | Japan | 210/727 |
| 54-73463 | 6/1979 | Japan | 210/727 |
| 674994 | 7/1979 | U.S.S.R. | 210/728 |

*Primary Examiner*—Ernest G. Therkorn
*Attorney, Agent, or Firm*—Sheridan, Ross & McIntosh

[57] ABSTRACT

A process of improving the flocculation activity of water-soluble anionic vinyl polymers used to flocculate suspended solids from aqueous systems, which aqueous systems also contain adverse amounts of calcium, magnesium, ferrous and/or ferric ions, the improvement which comprises performing the process in the presence of an effective amount of an alkali metal salt selected from the group consisting of alkali metal tetraborates, tribasic phosphates, permanganates and silicates.

7 Claims, No Drawings

FLOCCULANT COMPOSITION

This is a continuation of application Ser. No. 397,061 filed July 12, 1982 now abandoned.

FIELD OF THE INVENTION

The invention relates to an anionic polymer flocculant composition having improved properties in the presence of polyvalent metal ions. The invention further relates to a flocculation process utilizing said flocculant composition.

BACKGROUND ART

The deleterious effect of polyvalent metal ions, e.g., iron, calcium and magnesium, on the viscosity, rheology and flocculant activity of water soluble anionic polymers is known. The ferrous form of iron is the most notorious as it can exert its adverse effect at levels as low as about 2 parts per million (ppm) or lower. At levels of about 10–15 ppm of ferrous iron, about five times the amount of an anionic polymer is needed to achieve the same flocculant activity as is needed in the absence of the iron. In some instances, it may take more than 5 times the amount. An anionic polymer flocculant can almost completely lose its activity in a period of 6–8 hours in the presence of 15–25 ppm of ferrous iron. Higher levels of ferric iron are needed before an adverse effect on the anionic polymer is observed. Calcium and magnesium generally require levels exceeding 100 ppm before they affect the flocculant activity of an anionic polymer. The anionic polymers may be exposed to the polyvalent metal ions from a variety of sources including the make-up water in which the polymer is dissolved or the aqueous environment in which the flocculant is used.

To overcome this problem, sodium hydroxide has been added to the make-up water used to prepare the anionic polymer flocculant. However, this technique is not generally utilized because of the difficulties associated with obtaining the appropriate pH to cause the precipitation of the iron without causing the substantial hydrolysis of the polymer.

PRIOR ART STATEMENT

Japanese Patent Publication No. 890/72, published Jan. 11, 1972, discloses a process for the preparation of a water-soluble high molecular weight polyacrylamide having high viscosity and stringiness and at least partially hydrolyzed which process was conducted at a pH of 9–12 and utilizes a multicomponent buffering agent. The multicomponent buffering agent is comprised of at least two components such as phosphoric, boric, acetic, carbonic, amino acids and their salts as well as ammonia, urea, ammonium chloride, etc. The preferred multicomponent buffering agent is comprised of at least an alkali borate and alkali phosphate. The buffering agent is utilized in an amount which exceeds the weight of the monomer and causes or could cause substantial hydrolysis of the polymers due to pH. The additives as utilized in the present invention do not cause any substantial hydrolysis of the polymer. Further, the Japanese patent does not show the alkali borate being used alone.

As will be shown hereafter, the particular alkali phosphates used in this reference are inoperative for the purposes of this invention.

Japanese Patent Application Disclosure No. 81588/78, published July 19, 1978 discloses a process for the emulsion polymerization of a vinyl monomer which is effected in an aqueous dispersion wherein the aqueous dispersion contains a salt of N-acyl sarcosine and an alkali metal salt and/or ammonium salt of an oxyacid, e.g. alkali borates, silicates and phosphates. The process avoids the adhering phenomena of the polymer to protruding portions of the reactor and is not directed toward enhancing the flocculant activity of an anionic polymer.

DISCLOSURE OF THE INVENTION

The flocculant activity of anionic vinyl polymers is enhanced in the presence of polyvalent metal ions, e.g., iron, calcium and magnesium, by the addition of an alkali metal salt selected from the group consisting of alkali metal tetraborates, tribasic phosphates, permanganates and silicates The alkali metal salt can be added prior to the polymerization of the monomer to form the polymer, after the polymerization to water utilized to dilute the polymer and/or to the aqueous environment in which the flocculation is to occur. The alkali metal salt is added in an amount which is sufficient to prevent the deleterious action of the ions on the polymer; however, its upper limit cannot exceed that amount which would cause substantial hydrolysis of the polymer.

In another aspect of the invention, it is contemplated that a preferred flocculant composition would be a water-in-oil emulsion of the water-soluble anionic acrylic acid polymer which contains the alkali metal salt.

The amount of alkali metal salt that is preferably used in the practice of the invention may usually be calculated based on the weight of the water-soluble anionic vinyl polymer. Generally, the amount will range between 0.1–6% by weight with a preferred dosage being between 2–4% by weight. In those cases where high soluble iron or hardness ions are present, additional alkali metal salt may be added to either the polymer makeup solution or to the system being treated.

MODES OF THE INVENTION

The water-soluble anionic vinyl polymers of this invention are polymers or copolymers of acrylic acid containing at least 1% by weight of acrylic acid or a salt of acrylic acid; preferably they contain at least 10% by weight and more preferably at least 25% by weight of acrylic acid or a salt thereof. Examples of materials of this type include polymers of acrylic and methacrylic acid and copolymers of acrylic and methacrylic acid with other non-ionic water-soluble monomers such as acrylamide, as well as polyacrylic acid or its alkali metal salts produced by the polymerization of the desired monomers or derived from hydrolysis of polyacrylamide in latex form. A preferred polymer is a copolymer of sodium acrylate and acrylamide containing from about 1 to about 100% sodium acrylate and from about 99 to about 0% by weight of acrylamide. It is to be understood that the anionically charged or modified polymers and copolymers utilized in this invention need only be slightly anionically charged. The molecular weights of these polymers generally exceed 500,000, but may vary over a wide range, e.g., 10,000 to 24,000,000. The preferred polymer has a molecular weight in excess of 1,000,000 and a more preferred polymer has a molecular weight in excess of 4,000,000.

The alkali metal salts of the invention are inorganic and are selected from the group consisting of alkali metal tetraborates, tribasic phosphates, permanganates and silicates. Preferred metal salts are sodium tetraborate, potassium tetraborate, sodium metasilicate and potassium or sodium tribasic phosphate. The more preferred additives are sodium tetraborate, potassium tetraborate and sodium silicate ($Na_2SiO_3.9H_2O$). The sodium and potassium tetraborates are most preferred. Obviously, the amount of alkali metal salt which will be present with the flocculant should be sufficient to interfere with the polyvalent metal ion's ability to deleteriously affect the anionic polymer. As long as the alkali metal salt is not added in an amount which causes substantial hydrolysis of the polymer, the amount is generally not critical. The polymer is considered substantially hydrolyzed when it has essentially lost its nonionic character resulting in a substantial loss of its flocculating properties. Substantial hydrolysis generally occurs when the pH of the polymer solution exceeds about 9 and stands for a long enough time period. Thus, the additive will usually be added in an amount of from about 5 to about 35 weight percent and, preferably, from about 15 to about 25 weight percent based on monomer when added prior to polymerization. When the alkali metal additive is added after the polymerization, then it is generally added in an amount of from about 0.5 to about 10% by weight and preferably from about 2 to about 6% by weight based on the weight of the polymer.

The method of adding the alkali metal salt is not particularly critical as long as the method takes into consideration the limited water solubility of the additives. It is preferred that the alkali metal salt be present prior to the anionic polymer coming into contact with the polyvalent metal ions. Thus, it can be added to the monomer prior to polymerization, it can be added after polymerization, it can be added to the water in which the polymer will be dissolved or even added to the aqueous environment containing the solids to be flocculated. When added prior to polymerization, it is preferably added as an aqueous solution or solid to the monomer or monomer solution. When added to the polymer, it is preferably added as an aqueous solution either prior to or after solidifying of the polymer. Alternatively, when the polymer is in a water-in-oil emulsion, a hot aqueous solution of the alkali metal is preferably added with mixing. For ease of solubilization when the alkali metal is added to the water in which the polymer will be placed, it is added as an aqueous solution.

The use of water-soluble anionic polymers as flocculants is well known. For example, they are utilized as flocculants in the treatment of municipal and industrial wastes, coal processing plants and in paper production. The flocculant composition and the flocculating processes of this invention are beneficially utilized when the water-soluble anionic polymer flocculant is expected to be utilized in the presence of from about 2 to about 30 or greater parts per million of solubilized ferrous iron or greater than about 25 ppm of ferric iron. The most common ion would be that of ferrous or ferric however, magnesium and calcium can also create adverse effects at levels exceeding 100 ppm. The use of the additive in conjunction with the water-soluble anionic polymer or copolymer substantially decreases or eliminates the adverse effects on viscosity, rheology and flocculating capabilities of the polymer, and thus, reduces the amount of polymer required for the flocculation process.

The water-soluble anionic vinyl polymers utilized in this invention may be produced by any known methods of conducting polymerization reactions. Thus, aqueous and emulsion polymerization techniques may be utilized.

A preferred flocculant composition or flocculant process utilizes an water-in-oil emulsion of the water-soluble anionic acrylic acid polymer to which the alkali metal salt can be added prior to polymerization, after polymerization, to the aqueous solution in which the water-in-oil polymer is dissolved or to the aqueous environment in which the flocculation is to occur. When a water-in-oil emulsion is utilized, it will contain four basic components. These components and their weight percentages in the emulsions are listed below:

A. Water soluble anionic vinyl addition polymer:
  1. Generally from 5–60%;
  2. Preferably from 20–40%; and
  3. Most preferably from 25–35%;
B. Water:
  1. Generally from 20–90%;
  2. Preferably from 20–70%; and
  3. Most preferably from 30–55%;
C. Hydrophobic liquid:
  1. Generally from 5–75%;
  2. Preferably from 5–40%; and
  3. Most preferably from 20–30%; and
D. Water-in-oil emulsifying agent:
  1. Generally from 0.1–21%;
  2. Preferably from 1–15%;
  3. Most preferably from 1.2–10%.

It is also possible to further characterize the water-in-oil emulsions of water soluble vinyl addition polymers with respect to the aqueous phase of the emulsions. This aqueous phase is generally defined as the sum of the polymer or copolymer present in the emulsion plus the amount of water present in the emulsion. This terminology may also be utilized in describing the water-in-oil emulsions which are useful in this invention. Utilizing this terminology, the aqueous phase of the water-in-oil emulsions generally consists of 25–95% by weight of the emulsion. Preferably, the aqueous phase is between 60–90% and most preferably from 65–85% by weight of the emulsion.

The emulsions also may be characterized in relation to the water/oil ratios. This figure is simply a ratio of the amount of water present in the emulsion divided by the amount of hydrophobic liquid present in the emulsion. Generally, the water-in-oil emulsions of this invention will have a water/oil ratio of from 0.25 to 18. Preferably, the water-in-oil ratio will range from 0.5–14, and most preferably from 1.0–2.75.

The hydrophobic liquids or oils used in preparing these emulsions may be selected from a large group of organic liquids which include liquid hydrocarbons and substituted liquid hydrocarbons. A preferred group of organic liquids are paraffinic hydrocarbon oils. Examples of these types of materials include a branch-chain isoparaffinic solvent sold by Humble Oil and Refinery Company under the trade name "Isopar M" described in U.S. Pat. No. 3,624,019 and a paraffinic solvent sold by the Exxon Company, U.S.A. called "Low Odor Paraffinic Solvent" (LOPS). Typical specifications of this material are set forth below in Table I.

TABLE I

| | |
|---|---|
| Specific Gravity 60°/60° F. | 0.780–0.806 |
| Color, Saybolt | + 30 min. |

TABLE I-continued

| | |
|---|---|
| Appearance, visual | Bright & Clear |
| Aniline Point, °F., ASTM D-611 | 160 min. |
| Distillation, °F., ASTM D-86 | |
| IBP | 365 min. |
| FBP | 505 min. |
| Flash Point, °F. TCC | 140 min. |
| Sulfur, ppm, Microcoulometer | 15 max. |

While paraffinic oils are the preferred materials for use in preparing the water-in-oil smulsions, other organic liquids can be utilized. Thus, mineral oils, kerosenes, naphthas, and in certain instances petroleum may be used. Although they could be used, solvents such as benzene, xylene, toluene, and other water immiscible hydrocarbons having low flash points or toxic properties are generally avoided due to problems associated with their handling.

Any conventional water-in-oil emulsifying agent can be used such as sorbitan monostearate, sorbitan monooleate, and the so-called low HLB materials which are all documented in the literature and are summarized in the Atlas HLB Surfactants Selector. Although the mentioned emulsifiers are used in producing good water-in-oil emulsions, other surfactants may be used as long as they are capable of producing these emulsions. It is also contemplated, however, that other water-in-oil emulsifying agents can be utilized.

U.S. Pat. No. 3,997,492 shows the use of emulsifiers generally having higher HLB values to produce stable emulsions similar in character to those discussed above. With the use of the equations present in this reference, which is hereinafter incorporated by reference, emulsifiers having HLB values between 4-9 can be utilized in the practice of this invention.

In addition to the reference described above, U.S. Pat. No. 4,024,097 discloses particular emulsifying agents for the water-in-oil emulsions. These emulsions are generally prepared according to this reference utilizing a water-in-oil emulsifying agent comprising a partially esterified lower N,N-dialkanol substituted fatty amide. Additionally, other surfactants may be combined to produce emulsions having small particle sizes and excellent storage stability.

The general method for the preparation of emulsions of the type described above is contained in Vanderhoff, U.S. Pat. No. 3,284,393, which is hereinafter incorporated by reference. A typical procedure for preparing water-in-oil emulsions of this type includes preparing an aqueous solution of a water soluble vinyl addition monomer and adding this solution to one of the hydrocarbon oils described above. With the addition of a suitable water-in-oil emulsifying agent and under agitation, the emulsion is then subjected to free radical polymerization conditions and a water-in-oil emulsion of the water soluble vinyl addition polymer is obtained. It should be pointed out that the ingredients are chosen based upon the weight percentages given above and their compatability with each other. As to choice of free radical catalyst, these materials may be either oil or water soluble and may be from the group consisting of organic peroxides, Vazo (U.S. Registered Trademark, E. I. duPont) type materials, redox type initiator systems, etc. Additionally, ultraviolet light, microwaves, etc. will also cause the polymerization of water-in-oil emulsions of this type.

The water-in-oil emulsions of the finely divided water-soluble polymers useful in this invention contain relatively large amounts of polymer. The polymers dispersed in the emulsion are quite stable when the particle size of the polymer is from the range of 0.1 microns up to about 5 microns. The preferred particle size is generally within the range of 0.2 microns to about 3 microns. A most preferred particle size is generally within the range of 0.2 to 2.0 microns.

The emulsions prepared having the above composition generally have a viscosity in the range of from 50 to 1000 cps. It will be seen, however, that the viscosity of these emulsions can be affected greatly by increasing or decreasing the polymer content, oil content, or water content as well as the choice of a suitable water-in-oil emulsifier.

Another factor attributing to the viscosity of these types of emulsions is the particle size of the polymer which is dispersed in the discontinuous aqueous phase. Generally, the smaller the particle obtained the less viscous the emulsion. At any rate, it will be readily apparent to those skilled in the art as to how the viscosity of these types of materials can be altered. It will be seen that all that is important in this invention is the fact that the emulsion be somewhat fluid, i.e.: pumpable.

The water-in-oil emulsions of the water-soluble polymers discussed above have unique ability to rapidly invert when added to aqueous solution in the presence of an inverting agent or physical stress. Upon inversion, the emulsion releases the polymer into water in a very short period of time when compared to the length of time required to dissolve a solid form of the polymer. This inversion technique is described in U.S. Re No. 28,474 to Anderson, hereinafter incorporated by reference. As stated in the Anderson reference, the polymer-containing emulsions may be inverted by any number of means. The most convenient means resides in the use of a surfactant added to either the polymer-containing emulsion or the water into which it it to be placed. The placement of a surfactant into the water causes the emulsion to rapidly invert and release the polymer in the form of an aqueous solution. When this technique is used to invert the polymer-containing emulsion the amount of surfactant present in the water may vary over a range of 0.01 to 50 percent based on the polymer. Good inversion often occurs within the range of 1.0-10 percent based on polymer.

The preferred surfactants utilized to cause the inversion of the water-in-oil emulsion when the emulsion is adeed to water are hydrophilic and are further characterized as being water soluble. Any hydrophilic type surfactant such as ethoxylated nonyl phenols, ethoxylated nonyl phenol formaldehyde resins, dioctyl esters of sodium succinate and octyl phenol polyethoxy ethanols, etc. can be used. Preferred surfactants are generally nonyl phenols which have been ethoxylated with between 8-15 moles of ethylene oxide. A more complete list of surfactants used to invert the emulsion are found in Anderson, U.S. Re. No. 28,474 at Columns 4 and 5.

In the formulas shown for the makeup of the water-in-oil emulsions of the water-soluble anionic vinyl polymer, preferred composition useful in the practice of this invention would utilize in such formulas between 0.5-10% by weight of the alkali metal salts. A typical generic composition of the water-in-oil emulsion of the water-soluble anionic vinyl polymer would be formulated so as to contain the alkali metal salts in accordance with the following:

A. from 5-60% water-soluble anionic vinyl addition polymer;

B. from 20-90% water;
C. from 5-75% hydrophobic liquid;
D. from 0.1-21% water-in-oil emulsifying agent; and
E. 0.5-10% by weight of an alkali metal salt selected from the group consisting of alkali metal tetraborates, tribasic phosphates, permanganates and silicates.

EXAMPLE 1

POLYMERIZATION PROCESS INCORPORATING SODIUM TETRABORATE

A polymerization reaction was conducted in a one and one-half liter resin flask equipped with a stirrer, thermomter, condenser, nitrogen purge tube, heating mantle and means of cooling.

The following ingredients were placed into the flask.

| Oil phase | Parts by Weight |
| --- | --- |
| Low odor paraffinic solvent | 25.25 |
| Sorbitan monooleate | 1.22 |
| Sorbitan monostearate | 0.73 |

Then, the aqueous phase consisting of the ingredients listed below were added to the oil phase with stirring at 1000 rpm.

| Aqueous phase | Parts by Weight |
| --- | --- |
| Acrylamide solution (44.8%,) | 42.15 |
| acrylic acid | 8.0 |
| $Na_2B_4O_7$ | 6.0 |
| De-ionized water | 7.56 |
| Ethylene diamine tetraacetic acid | .15 |
| NaOH (50%) | 8.89 |

The temperature of the reaction flask was raised to 45° C. with constant nitrogen purging at which time the catalyst was added, consisting of 0.04 pts/wt. of 2,2'-azo bis-isobutyro nitrile.

The reaction was allowed to proceed at 46±2° C. for five (5) hours. At the end of this time, the temperature was increased to 60° C. for one (1) hour. Total reaction time consisted of six (6) hours. The resulting latex polymer was then cooled and recovered.

EXAMPLE 2

To test the ability of the various additives to complex $Fe^{+2}$ ions and ascertain their effect on polymer makeup and activity, solutions of the additives were prepared containing an amount equivalent in weight to that of a 2.5% solution of sodium tetraborate.

Each test solution was prepared by mixing deionized water; an amount of $FeSO_4.7H_2O$ sufficient to give a conc. of 25 ppm. of $Fe^{+2}$ in the final solution; the respective additive and a 1% solution of standard polymer.

The mixtures were then measured for viscosity on a Brookfield viscometer and their pH was noted.

Results of the experiments are given in Table 2.

TABLE 2

| Additive | Eq. Wt. | % Soln | pH | 1% Polymer Soln. Viscosity (cps) |
| --- | --- | --- | --- | --- |
| $Na_2B_4O_7$ | 145 | 2.5 | 8.4 | 830 |
| $Na_2SiO_3.9H_2O$ | 150 | 2.5 | 10.0 | 865 |
| $Na_3PO_4.12H_2O$ | 126.6 | 2.2 | 7.5 | 735 |
| $K_2B_4O_7$ | 162 | 2.8 | 8.3 | 810 |
| $KMnO_4$ | 158 | 2.7 | 7.6 | 885 |
| NaOH | 40 | 0.7 | 10.1 | 860 |
| $Na_2CO_3$ | 53 | 0.9 | 6.9 | 810 |

EXAMPLE 3

The additives of Example 2 were tested for their ability to enhance flocculation utilizing the mining coal slurry test. Results are expressed as replacement ratios which refers to the dosage of the experimental product divided by the dosage of a standard product required to achieve the desired results.

Example $$\frac{\text{Experimental dosage}}{\text{Standard dosage}} = \frac{4.5 \text{ ml.}}{3.0 \text{ ml.}} = 1.5 \, R.R.$$

The replacement ratios, e.g. activity in comparison with $Na_2B_4O_7$, for the additives tested measured at 25 ppm $Fe^{+2}$ are given in Table 3.

TABLE 3

| Additive | R.R. |
| --- | --- |
| $Na_2B_4O_7$ | 1.0 |
| $Na_2SiO_3.9H_2O$ | 0.9 |
| $Na_3PO_4.12H_2O$ | 1.25 |
| $K_2B_4O_7$ | 1.0 |
| $K MnO_4$ | 1.9 |
| NaOH | 0.8 |
| $Na_2CO_3$ | 1.05 |
| Polymer alone | 5.4 |

EXAMPLE 4

Performance of the standard polymer and the polymer with 2.5% sodium tetraborate added were tested by the method of Example 3 and expressed as replacement ratios at varying concentrations of $Fe^{+2}$. Results are given in Table 4.

TABLE 4

| Conc. $Fe^{+2}$ (ppm) | R.R. of Standard Polymer | R.R. of Polymer with 2.5% $Na_2B_4O_7$ |
| --- | --- | --- |
| 2.5 | 1.1 | — |
| 5 | 1.7 | 1.0 |
| 10 | 3.7 | 1.1 |
| 15 | 5 | 1.4 |
| 20 | 5.3 | 1.9 |
| 30 | 5.5 | 3 |
| 50 | 5.7 | 4.1 |

What is claimed is:

1. In a process for improving the flocculation activity of water-soluble anionic vinyl polymers used to flocculate suspended materials from aqueous systems, which aqueous systems also contain amounts of polyvalent metal ions adverse to the viscosity, rheology, and flocculating capabilities of the polymer, the improvement which comprises performing the process in the presence of an alkali metal salt selected from the group consisting of alkali metal tetraborates, permanganates, tribasic phosphates and silicates, and alkali metal salt being present in an amount of from about 5 to about 35 weight percent based on monomer when added prior to polymerization and from about 0.5 to about 10% by weight based on the weight of the polymer when added after polymerization, whereby said alkali metal salt does not substantially hydrolyze said anionic vinyl polymer.

2. The process of claim 1 wherein the alkali metal salt is sodium tetraborate.

3. The process of claim 1 wherein the alkali metal salt is sodium silicate.

4. The process of claim 1 wherein the alkali metal salt is sodium phosphate.

5. The process of claim 1 wherein the alkali metal salt is potassium tetraborate.

6. The process of claim 1 wherein the alkali metal salt is potassium permanganate.

7. The process of claim 1 wherein the anionic vinyl polymers are selected from the group consisting of polymers and/or copolymers of acrylic acid.

* * * * *